United States Patent [19]

DiSalvo et al.

[11] Patent Number: 4,504,633

[45] Date of Patent: * Mar. 12, 1985

[54] MODIFIED POLY(OXAZOLIDONE/URETHANE) COMPOSITIONS

[75] Inventors: Anthony L. DiSalvo, Greenwich, Conn.; Chung-Chieh Tsai, South Salem, N.Y.

[73] Assignee: Stauffer Chemical Company, Westport, Conn.

[*] Notice: The portion of the term of this patent subsequent to May 31, 2000 has been disclaimed.

[21] Appl. No.: 499,956

[22] Filed: Jun. 1, 1983

[51] Int. Cl.$^3$ .................. C08F 283/10; C08L 63/10
[52] U.S. Cl. ........................ 525/438; 525/455; 525/528; 525/529; 525/530
[58] Field of Search ............ 525/529, 528, 530, 438

[56] References Cited

U.S. PATENT DOCUMENTS

| | | | |
|---|---|---|---|
| Re. 28,715 | 2/1976 | Stamberger | 524/762 |
| Re. 29,118 | 1/1977 | Stamberger | 521/137 |
| 3,652,639 | 3/1972 | Pizzini et al. | 521/137 |
| 3,823,201 | 7/1974 | Pizzini et al. | 521/137 |
| 4,198,488 | 4/1980 | Drake et al. | 521/137 |
| 4,261,877 | 4/1981 | Vogt et al. | 525/63 |
| 4,386,191 | 5/1983 | DiSalvo et al. | 525/507 |
| 4,424,316 | 1/1984 | DiSalvo et al. | 525/528 |

*Primary Examiner*—Melvyn I. Marquis
*Assistant Examiner*—A. L. Carrillo
*Attorney, Agent, or Firm*—Richard P. Fennelly

[57] ABSTRACT

Isocyanate-reactive prepolymers containing at least one terminal epoxide group with an associated secondary hydroxy group and grafted thereto a polymeric moiety derived from polymerizing an ethylenically unsaturated monomer are disclosed. When reacted with isocyanate, these prepolymers form thermoset compositions which comprise oxazolidone groups in the backbone that are separated by ester linkages, urethane linkages in side chains attached to the backbone, and polymeric moieties derived from one or more ethylenically unsaturated monomer grafted to the polymer backbone.

15 Claims, No Drawings

MODIFIED POLY(OXAZOLIDONE/URETHANE) COMPOSITIONS

BACKGROUND OF THE INVENTION

1. Field of the Invention

The present invention relates to modified poly(oxazolidone/urethane) compositions.

2. Description of the Prior Art

The prior art illustrates the sequential reaction of polyol, acid anhydride and polyepoxy compound to form a prepolymer which is then cured. For instance, in U.S. Pat. No. 3,576,903 to G. L. Groff the first step of the reaction to form the prepolymer involves reaction of acid anhydride and polyhydroxy compound to yield an acid-terminated polymer. This acid-terminated polymer is then reacted with an epoxy compound such that at least two epoxide equivalent weights are present for each carboxyl equivalent weight of acid-terminated polymer. Groff then teaches curing of this prepolymer by use of an active hydrogen compound known to react with epoxy resins (e.g., polybasic acids, cyclic anhydrides, cyclic dianhydrides, and aromatic or aliphatic diamines) rather than with any compound containing an isocyanate group.

The formation of polymers containing oxazolidone and urethane linkages by reaction of a polyisocyanate with a prepolymer formed by a two step reaction involving (1) reaction of a dicarboxylic acid or anhydride (e.g., phthalic anhydride) and saturated dihydric alcohol followed by (2) reaction with a diepoxide is described in U.S. Pat. No. 3,847,874 to Y. Murakami et al. The reaction conditions described in this patent yield a prepolymer which contains a hydroxy group at one end and a terminal epoxide group with adjacent secondary, non-terminal hydroxy group at the other end. A diisocyanate will react with such a prepolymer to form a recurring polymer unit containing urethane and oxazolidone linkages in the backbone and urethane side chains.

RELATED APPLICATION

Poly(oxazolidone/urethane) compositions containing oxazolidone linkages in its polymer backbone which are separated by ester linkages and which also contains urethane linkages in a side chain are described in applicants' copending U.S. Pat. No 4,386,191, which is incorporated herein by reference. Such compositions are formed by reaction of an epoxy and hydroxy group-containing prepolymer with a polyisocyanate, e.g., a diisocyante. The prepolymer is formed by reaction of polyol, acid anhydride and diepoxide, preferably in a single step reaction. The polymer ultimately formed can be used to form thermoset compositions for making molded articles, e.g., by reaction injection molding (RIM).

SUMMARY OF THE PRESENT INVENTION

The present invention relates to an improvement of the invention described in the aforementioned related application. It involves the incorporation of a polymeric segment from an ethylenically unsaturated monomer to modify and improve the physical properties of the resulting cured polymer, e.g., in a preferred embodiment to increase the crystallinity of the thermoset making it more resilient and giving it a better heat sag resistance. This latter feature can be important when the product containing the thermoset is one which is coated and goes through repetitive heat cycles. Heat sag results in loss of shape for the part thereby causing cracking and/or separation of the coating.

The incorporation of the polymeric segment into the modified prepolymer compositions of the present invention can be accomplished in various ways. One way is to first form a copolymer of a major amount of the desired unsaturated monomer and an unsaturated dicarboxylic acid anhydride and then mix that anhydridecontaining copolymer product with polyol, acid anhydride and polyepoxy compound followed by heating to form the modified prepolymer. Alternatively, the relatively small amount of unsaturated dicarboxylic acid anhydride can be combined with polyol, acid anhydride, polyepoxy compound and heated so that an unsaturated prepolymer is formed which can be mixed with the relatively larger amount of unsaturated monomer intended as the modified and an initiator. Free radical polymerization bonds the polymeric segment to the moiety from the unsaturated anhydride. Finally, unsaturated anhydride, and monomer, with initiator, can both be added to polyol, acid anhydride, and polyepoxy compound and heated. The molecular weight of the polymeric segment can be adjusted by various known techniques including changes in the ratio of monomer to initiator, the use of a chain transfer agent or modification of the temperature of the free radical polymerization.

Reaction of any of the above-described epoxy-containing polyols with a polyisocyanate, e.g., diisocyanate, yields thermoset compositions. The physical property changes of such modified compositions, due to the presence of polymer segments derived from the unsaturated monomer component, can be varied due to the type of unsaturated monomer chosen. Use of monomers tending to produce relatively rigid polymeric segments (e.g., styrene, methyl methacrylate and/or acrylonitrile) will tend to produce harder, more rigid and tough thermoset compositions. Use of monomers tending to produce relatively rubbery polymers (e.g., the alkyl acrylates or higher alkyl methacrylates) will produce more impact resistant compositions.

DESCRIPTION OF THE PREFERRED EMBODIMENTS

The modified poly(oxazolidone/urethane)compositions of the present invention are formed by reacting a polyisocyanate, e.g., diisocyanate, with a modified prepolymer composition containing a prepolymer having terminal epoxy groups and non-terminal, secondary hydroxy groups.

The modified prepolymer is formed by the incorporation of polymer segments from an unsaturated monomer. Grafting of the polymeric segments from unsaturated monomer onto the basic prepolymer (which is the subject of copending U.S. Ser. No. 309,737, now U.S. Pat. No. 4,386,191) is accomplished by using a relatively smaller amount of an unsaturated acid anhydride. Generally speaking, the mole ratios of unsaturated monomer to unsaturated anhydride will range from about 700:1 to about 3:1. The amount of unsaturated monomer to all the other reactants used to form the basic prepolymer from polyol, anhydride and polyepoxy compound will generally be from about 1% to about 90%.

As described in earlier copending application Ser. No 309,737 the basic prepolymer is formed by reaction of polyol, anhydride and diepoxide. Generally speaking, the amounts of these three reactants will be 2 moles of hydroxy as polyol with 2 moles or less of anhydride and 2 moles or more of diepoxide. Such a prepolymer, as will be described in greater detail below, is modified by the presence of polymeric segments from an ethylenically unsaturated monomer with the segments being bonded thereto by means of a moiety from an unsaturated dicarboxylic acid anhydride.

If desired all reactants (polyol, anhydride, polyepoxide, unsaturated anhydride and unsaturated monomer) can be combined with initiator and heated. Alternatively, a copolymer of unsaturated anhydride and monomer can first be formed followed by its combination with polyol, anhydride, polyepoxy compound, and catalyst, with heating. Finally, polyol, anhydride, unsaturated anhydride, and polyepoxide can be reacted, forming an unsaturated prepolymer which can be combined with unsaturated monomer and initiator and heated.

Representative acid anhydrides which can be chosen to form the basic prepolymer encompass both the aromatic and aliphatic anhydrides including: adipic, glutaric, sebacic, succinic, phthalic, tetrachlorophthalic, and tetrabromophthalic.

Representative polyols include: polyethylene glycol, polypropylene glycol, polypropylene triol, 2,4-butanediol, pentaerythritol, 2,3-butanediol, ethylene glycol, propylene glycol, and mixtures thereof, trimethylene glycol, 1,12-dihydroxyoctadecane, 1,4-dihydroxycyclohexane, 2,2-dimethyl-1,3-propanediol, 2-ethyl-2-butylpropanediol, glycerol, erythritol, sorbitol, mannitol, inositol, trimethylol propane, dipentaerythritol, polybutadiene diol, polytetramethylene diol, polycaprolactone diol and phosphorus containing diols and polyols.

The type of diepoxides shown in U.S. Pat. No. 4,066,628 to K. Ashida et al., which is incorporated herein by reference, can be employed for use in connection with the present invention. Such diepoxides include the diglycidyl ethers of dihydric mononuclear and fused ring phenols, the diglycidyl ethers of nonfused polynuclear phenols having an alkylene, sulfone, carboxy, oxygen or sulfur bridging group between the phenol rings, the diglycidyl ethers of novolac resins, dicyclopentadiene dioxide, vinyl cyclohexene dioxide, the dicyclohexyl oxide carboxylates, and the diglycidyl derivatives of aromatic primary amines. Some representative diepoxides include the diglycidyl ethers of bisphenol A, hydroquinone, resorcinol, catechol, methylhydroquinone, 1,6-hexanediol, 1,12-dodecanediol, alicyclic diepoxides, such as vinylcyclohexene dioxide, and dicyclopentadiene dioxide.

The combination of unsaturated anhydride and unsaturated monomer is responsible for forming the novel polymer-grafted prepolymer compositions of the present invention.

Representative ethylenically unsaturated anhydrides which can be chosen can be selected from the group consisting of maleic anhydride, itaconic anhydride, propenyl succinic anhydride, citraconic anhydride, mesaconic anhydride, cyclohexene dicarboxylic anhydride, and endomethylene cyclohexene dicarboxylic anhydride. These compounds contain unsaturation so as to be capable of polymerizing with ethylenically unsaturated monomer chosen as modifier and also contain a functional group reactive with the hydroxyl groups of the polyol employed in forming the modified prepolymer.

Various types of ethylenically unsaturated monomers can be chosen including acrylonitrile, styrene, butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, αethoxyacrylate, methyl α-acetaminoacrylate, butyl acrylate, 2-ethylhexyl acrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'vinyloxy diethyl ether, vinyl 2-ethylmercaptoethyl ether, vinyl methyl ketone, vinyl ethyl ketone, vinyl phosphonates such as bis β-chloroethyl vinyl phosphonate), vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Chain transfer agents, such as halogen-containing compounds, sulfur-containing compounds and dipentene can be effectively used, if desired, to control the molecular weight of the polymeric segment. The amount of chain transfer agent that is utilized can vary from about 0.1% to about 10%, by weight, of the ethylenically unsaturated monomers that are employed.

The initiators which can be used to bring about graft polymerization between the unsaturated anhydride moiety and monomer can be one of those conventionally employed in conventional amount. For example, the concentration of the initiator can vary from about 0.001 to about 5 percent, preferably from about 0.2 to about 1.5 percent; however, any effective catalytic amount is satisfactory. Illustrative initiators are the wellknown free radical type of vinyl polymerization initiators for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butylryl peroxide, diisopropylbenzene hydroperoxide, cumene hydroperoxide, diacetyl peroxide, di-alpha-cumyl peroxide, dipropyl peroxide, diisopropyl peroxide, isopropyl t-butyl peroxide, butyl t-butyl peroxide, dilauroyl peroxide, difuroyl peroxide, ditriphenylmethyl peroxide, bis(p-methoxy-benzoyl) peroxide, rubrene peroxide, ascaridol, t-butyl peroxybenzoate, t-butyl peroctoate, diethyl peroxyterephthalate, propyl hydroperoxide, isopropyl hydroperoxide, n-butyl hydroperoxide, t-butyl hydroperoxide, cyclohexyl hydroperoxide, transdecalin hydroperoxide, alpha-methylbenzyl hydroperoxide, tetralin hydroperoxide, triphenylmethyl hydroperoxide, diphenylmethyl hydroperoxide, 2,2'-azo-bis(2-methylbutyronitrile), 2,2'-azo-bis(2-methylheptonitrile), 1,1'-azo-bis(1-cyclohexane carbonitrile), dimethyl alpha, alpha'-azoisobutyrate, 4,4'-azo-bis(4-cyanopentanoic acid), azobisisobutyronitrile, persuccinic acid, diisopropyl peroxy dicarbonate, and the like. A mixture of catalysts may also be used.

The temperature and catalysts are chosen such that the catalyst has a satisfactory half-life at the temperature employed; preferably, the half life should be about 25 percent or less of the residence time in the reactor at the given temperature.

Depending upon the amounts of polyol, anhydride and diepoxide reacted in forming the basic prepolymer various structures are possible. Reaction of 2 moles of hydroxy as polyol with 2 moles or less of anhydride and 2 moles or more of diepoxide will produce the following prepolymer as the major prepolymer component in the composition, with $R_1$–$R_5$ independently being any group to which carbon atoms (or oxygen atoms) can be covalently bound to form a backbone chain, either unsubstituted (e.g., alkylene, arylene, alkylene/arylene chains optionally interrupted by hetero atoms or groups, such as carbonyl, ester, ether, sulfonyl, phosphonyl, etc.) or substituted (as above, with halogen, alkyl, aryl, alkoxy, phenoxy, cyano, etc. substitution) and R is derived from $R_1$–$R_5$ to form a monovalent substituent or is hydrogen:

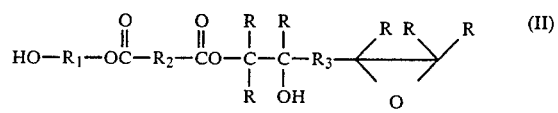

The presence of unsaturated anhydride and modifier will change either or both $R_2$ and $R_5$ in the above formula since these moieties would be due to the presence of the unsaturated anhydride and would have the structure with the —CR—CR— comprising a portion of the backbone segments $R_2$ and $R_5$:

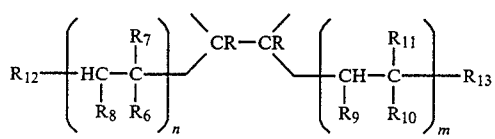

where $R_6$–$R_{13}$ are the same as R, above, in covering any atom or group of atoms to which carbon can be covalently bound (including hydrogen). It can be, for example, any group derived from the initiator employed in this invention (e.g., benzoyloxy, acetyloxy, aryl, alkyl, cyano-isopropyl, 2-cyano-4-methyl-2-pentyl, t-butoxy, hydroxy, cumyl, cumyloxy, alkylcarboxy, etc.). R in the above formula is derived from the acid anhydride reactant and can also be hydrogen with m and n being O or any positive integer.

Formation of this type of prepolymer is favored when the molar amount of anhydride is no more than 2 and the amount of diepoxide is not less than that of acid anhydride, based upon a molar amount of hydroxy groups in the polyol set at 2.

Depending upon the precise amounts of reactants employed, however, it is also possible to yield a prepolymer in which one end contains a terminal epoxy group with associated non-terminal, hydroxy group, and the other end terminates in a hydroxy group. This prepolymer has the formula given below with R, $R_1$ and $R_3$ having the same meaning as R–$R_5$, above, and $R_2$ having the same meaning as either $R_2$ or $R_5$:

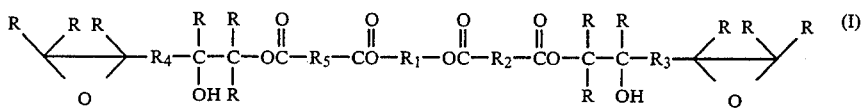

This type of prepolymer is produced in the process shown in U.S. Pat. No. 3,847,874 to Y. Murakami and is favored in the reaction when the molar amount of acid anhydride is present in amounts which approximate one half the molar amount of the hydroxy groups in the polyol that is present. In Formula II $R_2$ has the same for the modified prepolymer of the present invention given for $R_2$ in regard to Formula I, above.

The present invention includes prepolymer compositions which contain mixtures of both the aforementioned modified prepolymers as well as either one alone.

The modified prepolymer composition can be formed by mixing the polyol, anhydride and diepoxide with suitable modifying monomer and unsaturated anhydride (or copolymer thereof) preferably in the presence of an effective amount (0.02 to 2%, by weight of all the reaction ingredients) of a catalyst designed to promote the reaction as well as the thermoset formulation. Representative catalysts tending to favor oxazolidone formation include the quaternary ammonium salts (e.g., tetramethyl ammonium chloride); the metal alkoxides (e.g., lithium n-butoxide); the metal halides (e.g., lithium chloride) and their complexes (e.g., lithium chloride/hexamethylphosphoramide complex); and the organometallic compounds (e.g., trialkyl aluminum). Catalysts which favor urethane formation include the organotin compounds, diamines, and polyamines.

Once the modified prepolymer composition has been formed it is combined with a desired polyisocyanate, e.g., diisocyante, to form a reaction mixture from which the modified poly(oxazolidone/urethane) thermoset compositions of the present invention can be formed. If desired, the reaction medium can contain up to about 60%, by weight, of other materials which do not interfere with the reaction of the prepolymer and polyisocyanate. Representative ingredients include additional diepoxide or polyepoxide (functions as a solvent, if liquid), diol or polyol, and acrylate or methacrylate ester polymer to impart flexibility to the final product. If desired the reaction medium can also contain up to about 10%, by weight, of one or more of the following additives: blowing agents, flame retardants, coupling agents, dyes, stabilizers and mold releasing agents.

The amount of polyisocyanate chosen for reaction with the modified prepolymer should be substantially equivalent in regard to its isocyanate functionality (on an equivalent bases) to the total equivalents of epoxide and hydroxy groups in the prepolymer composition and any added ingredients which would react with the isocyanate. A slight excess of isocyanate (up to about 5% on a weight basis) can be tolerated but greater amounts whould be avoided since the formation of isocyanurate linkages would be favored. In general, the respective molar amount of oxazolidone and urethane linkages to one another in the thermoset will depend upon the type or types of prepolymers present and the presence of other isocyanate reactive groups added to the reaction mixture. If only the prepolymer composition and polyisocyanate are used and the diepoxy/dihydroxy prepolymer is present, a near 50:50 (oxazolidone:urethane) molar ratio polymer is produced. If the prepolymer composition contains the dual hydroxy, epoxy prepolymer to a greater degree, a greater number of urethane linkages will be formed as compared to oxazolidone linkages, unless additional epoxy moieties are added. Addition of additional hydroxy group compounds, e.g., diol or polyol, will yield a larger molar amount of urethane, whereas addition of epoxide materials, e.g., diepoxides, will increase the oxazolidone content of the product. The molar amount of oxazolidone to urethane can range from 90:10 to 1:99. When the molar amount of hydroxy groups in the polyol is 2, the amount of anhydride should not exceed about 2 and the amount of diepoxide should not be less than that of anhydride.

Any polyisocyanate capable of reaction with the epoxy and hydroxy groups contained in the prepolymer to form the desired oxazolidone and urethane linkages is contemplated for use by the present invention. Representative examples of suitable conventional polyisocyanates, which are used to form urethane polymers, for example, include such aromatic and aliphatic types as: the tolylene diisocyanates, the methylene bis(phenyl isocyanates), such as methylene bis(4-phenyl isocyanate), dianisidine diisocyanate, toluidine diisocyantes, m-xylene diisocyanate, 1,5-naphthylene diisocyanate, P-phenylene diisocyanate, and hexamethylene diisocyanate, carbodiimide modified diisocyanate (e.g., ISONATE 143L from Upjohn Co.) and other di- and higher polyisocyanates. Mixtures of such isocyanates can be used, if desired as well as polymeric polyisocyanates.

The resulting thermoset composition formed from the above-described reaction mixture is one which contains oxazolidone and urethane linkages in the recurring unit or units and which is essentially free of substantial amounts of isocyanurate linkages. The ultimate type of recurring unit and its amount will be dictated by the type of prepolymer or prepolymers mainly present in the prepolymer composition. Modified prepolymer (I) described above will produce a recurring unit of the following formula with $R-R_5$ having the same meaning as $R_1-R_5$ and $R_6-R_{19}$ are independently the same as $R_1-R_5$ and also include hydrogen:

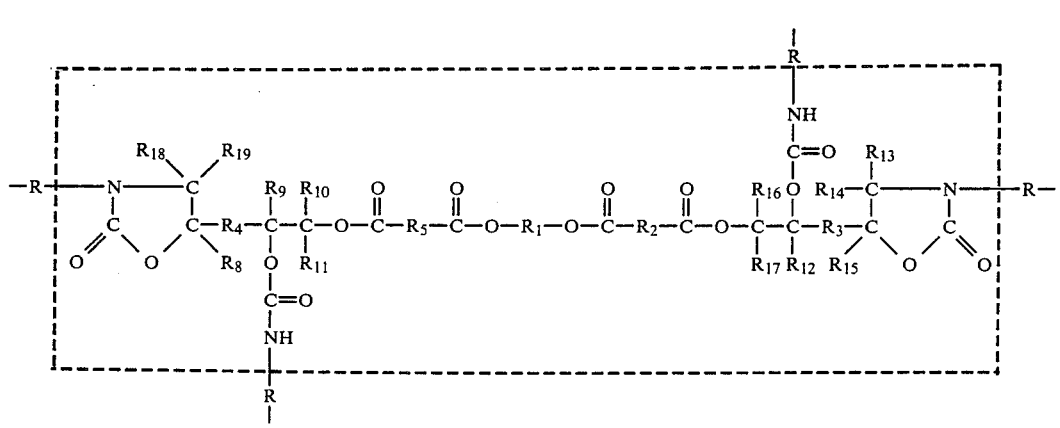

(III)

where either or both $R_2$ and $R_5$ in the above formula may have the structure

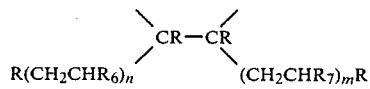

with $R_6$ and $R_7$ having the same meaning given heretofore.

Presence of modified prepolymer (II) will yield the following recurring unit with $R-R_3$ having the same meaning as $R_1-R_3$ and $R_4-R_{11}$ are the same and also include hydrogen:

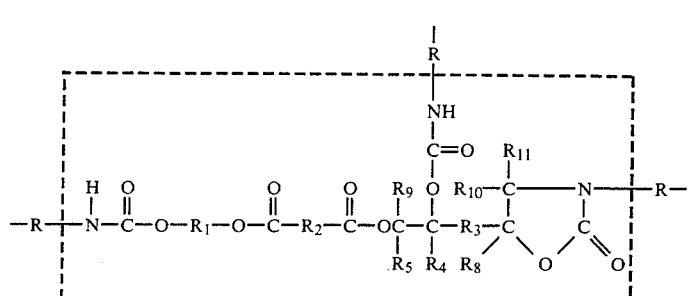

(IV)

Prepolymer compositions containing both prepolymers (I) and (II) would have a certain defined amount of both recurring units (III) and (IV) depending on the amounts of prepolymers (I) and (II) in the composition reacted with the polyisocyanate.

Recurring unit III has oxazolidone linkages in its backbone by virtue of reaction of the polyisocyanate with the terminal epoxy groups of prepolymer I. It has urethane groups in pendant side chains, rather than in the same chain as the oxazolidone, due to reaction of the pendant, non-terminal secondary hydroxy group in the prepolymer. The oxazolidone linkages in the recurring unit III are separated from one another by the additional presence in the backbone of ester linkages which are derived from the anhydride reactant.

Recurring unit IV has a urethane linkage adjacent one end of the backbone of the recurring unit and an oxazolidone linkage at the other end. A urethane linkage exists in a side chain of the unit intermediate the urethane and oxazolidone linkages. Ester linkages lie in the backbone intermediate the oxazolidone linkages in the backbone and the urethane linkages in the side chain.

Poly(oxazolidone/urethane) thermoset compositions which form a part of the present invention include those which contain recurring unit III, either alone, or in combination with no more than about 90% of IV.

The thermoset compositions of the present invention are useful in the fabrication of molded articles of manufacture, for example, by reaction injection molding techniques. If desired, the thermoset compositions can be combined with suitable reinforcing agents including glass fibers or flakes, graphite, wollastonite, mica, KELVAR aromatic polyamide fiber, nylon fiber, either alone or in combination with one or more coupling agents.

The present invention is illustrated by the Examples which follow.

EXAMPLE 1

A mixture containing 420 grams (0.428 equivalent weight of hydroxy groups) of polypropylene glycol (NIAX polyol PPG 2025 from Union Carbide Co.), 58 grams (0.392 equivalent weight) of phthalic anhydride, 1.0 gram (0.010 equivalent weight) of maleic anhydride, 154 grams (0.806 epoxy equivalent weight) of the diglycidyl ether of bisphenol A (EPON 828 brand from Shell Chemical Co.), and 3.5 grams of lithium chloride/dimethylformamide complex (1/1.5) was heated at 125° C.–135° C. After 2½ hours of heating, the resulting product was found to be free of acidic material.

The above unsaturated product was cooled to 35° C. and added to 70 grams (1.32 equivalent weights) of acrylonitrile and 1.0 gram of a free radical azobisisobutyronitrile initiator (VAZO 64 brand from Du Pont). The mixture was purged with nitrogen for 30 minutes and then heated to 70° C. to initiate polymerization. The mixture was subjected to cooling to maintain the temperature between 70° C. and 90° C. until the free radical polymerization subsided. This took about one hour. The product was stripped at high vacuum to eliminate residual monomers. The grafted prepolymer product, a free flowing liquid, had a viscosity of 500 poise (by Brookfield Viscometer Model LVT) at 22° C.

A mixture of 80 grams (0.044 mole epoxy) of the above acrylonitrile-grafted prepolymer, 25.3 grams (0.816 hydroxy equivalent weight) of ethylene glycol, 40 mg. of stannous octoate, and 8 mg. of dibutyltin dilaurate (T-12 brand from M and T Chemical Co.) was stirred under vacuum with 130 grams (0.909 isocyanate equivalent weight) of a carbodiimide modified 4,4'-diphenyl methane diisocyanate (ISONATE 143L brand from Upjohn Chemical Co.). The final mixture, after becoming homogeneous, was poured into a preheated mold (70° C.). The resin cured in less than 30 seconds and was demolded and post-cured at 125° C. for 1 hour. The thermoset plaque (3.18 mm. thick) gave 415 kg/cm$^2$ of tensile strength (ASTM D412), $11.6 \times 10^3$ kg/cm$^2$ of flexural modulus (ASTM D 474), and 1.92 J/cm of notched IZOD impact resistance (ASTM D 256).

A specimen (2.54 cm×15.24 cm) was cut from the thermoset plaque for the heat sag test which is a measurement of the ability of a plastic sample to resist distortion at an elevated temperature. The specimen was clamped onto a fixture at one end which left a 10.2 cm unsupported length. The fixture with the specimen was placed in an oven at 132° C. for 60 minutes. The difference between the vertical distances from the unsupported end of the specimen to the base of the test fixture measured before and after the heating was the heat sag. The specimen showed a heat sag of 1.1 cm.

EXAMPLE 2

A mixture containing 420 grams (0.428 hydroxy equivalent weight) of polypropylene glycol (NIAX polyol PPG 2025 from Union Carbide Co.), 58 grams (0.392 equivalent weight) of phthalic anhydride, 0.20 grams (0.002 equivalent weight) of maleic anhydride, 154 grams (0.806 epoxy equivalent weight) of the diglycidyl ether of bisphenol A (EPON 828 brand from Shell Chemical Co.), 3.5 grams of lithium chloride/dimethyl formamide (1/1.5 complex), 70 grams (1.32 equivalent weight) of acrylonitrile, 0.80 grams of benzoyl peroxide, and 0.40 grams of t-butyl hydroperoxide was purged with nitrogen for 30 minutes. The mixture was stirred and heated at 125° C.±5° C. until the resulting product was free of acidic material and the free radical polymerization completed as indicated by slow condensation of acrylonitrile monomers inside the condenser. The residual monomers were stripped by high vacuum. The resulting prepolymer product was a yellow viscous liquid (6,000 poise at 24° C.) and had an epoxide equivalent of 1847.

A thermoset plaque was made from the above prepolymer using the same compositions and procedures as they were described in the third paragraph of Example 1. The thermoset plaque gave 462 kg/cm² of tensile strength (ASTM D 412), 12.7×10³ kg/cm² of flexural modulus (ASTM D 474), 1.27 J/cm of notched IZOD (ASTM D 256), and 0.8 cm of heat sag.

EXAMPLES 3-5

The procedures set forth in Example 2 were applied in the following Examples. The various ingredients for the Examples are listed in Table I:

TABLE I

| Ingredients (gram) | EXAMPLE NUMBER | | |
|---|---|---|---|
| | 3 | 4 | 5 |
| NIAX PPG 2025 Polyol | 420 | 420 | 420 |
| Phthalic Anhydride | 58 | 58 | 58 |
| Maleic Anhydride | 0.50 | 2.0 | 1.0 |
| EPON 828 Diepoxide | 154 | 154 | 154 |
| LiCl.DMF Complex (1/1.5) | 3.5 | 3.5 | 0 |
| ADOGEN 464 Catalyst | 0 | 0 | 2.8 |
| Acrylonitrile | 70 | 70 | 70 |
| Benzoyl Peroxide | 0.80 | 0.80 | 0.80 |
| t-Butyl Hydroperoxide | 0.40 | 0.40 | 0.40 |

Grafted prepolymer products obtained from these examples were employed to make thermoset plaques using the same compositions and procedures described in the third paragraph of Example 1. The physical property characteristics for the thermoset plaques are listed in Table II:

TABLE II

| Physical Properties | EXAMPLE NUMBER | | |
|---|---|---|---|
| | 3 | 4 | 5 |
| Tensile Strength (kg/cm²) | 423 | 450 | 406 |
| Flexural Modulus (kg/cm²) | | | |
| at Room Temperature: | 16,900 | 14,500 | 12,000 |
| at 70° C.: | 10,200 | 7,700 | 7,000 |
| Notched IZOD Impact (J/cm): | 0.45 | 0.65 | 0.86 |
| Heat Sag (cm): | 1.0 | 1.0 | 0.5 |

EXAMPLE 6

Into a reaction flask equipped with a condenser, a nitrogen inlet, a thermometer, and a mechanical stirrer was charged 150 gm. of polyethylene glycol (NIAX polyol PPG 600 from Union Carbide Corp.), 72.5 gm. of phthalic anhydride, 1.0 gm. of maleic anhydride, and 190 gm. of the diglycidyl ether of bisphenol A. The mixture was heated at 120° C. for about 35 minutes until the resulting product was not acidic.

The foregoing product was added to 230 gm. of acetone, 96 gm. of acrylonitrile, and 1.5 gm. of 2,2'-azobis-2,4-dimethylvaleronitrile initiator. After being flushed with nitrogen for 30 minutes the mixture was heated at 55°-62° C. for one hour. The resulting prepolymer product was stripped by high vacuum and had an epoxide equivalent of 1109.

A mixture containing 66.4 gm. of the foregoing prepolymer, 34.6 gm. of polyethylene glycol (CARBOWAX PEG 200) and 20 mg. of dibutyltin dilaurate was mixed with 65 gm. of a modified diphenylmethane diisocyanate (ISONATE 191 diisocyanate from Upjohn). After being made homogeneous, the mixture was poured into a preheated mold held at 80° C. and cured for two minutes.

EXAMPLE 7

Into a reaction flask equipped with a condenser, a nitrogen inlet, a thermometer, and a mechanical stirrer was charged 420 gm. of polypropylene glycol (NIAX polyol PPG 2025), 58 gm. of phthalic anhydride, 1.0 gm. of maleic anhydride, 70 gm. of acrylonitrile, 154 gm. of the diglycidyl ether of bisphenol A, 3.5 gm. of lithium chloride/dimethyl formamide complex, 0.50 gm. of benzoyl peroxide, and 0.45 gm. of t-butyl hydroperoxide. The mixture, after being flushed with nitrogen at room temperature, was heated by an oil bath at 130° C. In about three hours the resulting product was free of acidic material. The product was stripped by vacuum.

A mixture containing 80 gm. of the above product, 25.3 gm. of ethylene glycol, 8 mg. of dibutyltin dilaurate, and 40 mg. of tin octoate was mixed with 130 gm. of a modified diphenylmethane diisocyanate (ISONATE 143L brand). The mixture, after being made homogeneous, was poured into a preheated (70° C.) mold and cured in 10 seconds. The cured, molded part was then removed from the mold and post cured at 125° C. for one hour.

EXAMPLE 8

A mixture containing 420 grams (0.430 hydroxy equivalent weight) of polypropylene glycol (NIAX Polyol PPG 2025 brand from Union Carbide Co.), 58.0 grams (0.392 equivalent weight) of phthalic anhydride, 1.0 grams (0.010 equivalent weight) of maleic anhydride, 33.5 grams (0.632 equivalent weight) of acrylonitrile and 1.1 grams of azobisisobutyronitrile initiator (VAZO 64 brand from DuPont) was purged with nitrogen for 30 minutes and heated at 70°-80° C. for about 45 minutes till the free radical polymerization subsided. The mixture was added with 154 grams (0.806 epoxy equivalent weight) of diglycidyl ether of bisphenol A (EPON 828 brand from Shell Chemical Co.) and 3.5 grams of lithium chloride/dimethyl formamide (1/1.5 complex). The mixture was then heated at 125°-135° C. for about one hour till the resulting product was free of acidic material. A polyacrylonitrile grafted prepolymer was obtained.

A mixture of 80 grams of the above polyacrylonitrile grafted prepolymer, 25.3 grams (0.816 hydroxy equivalent weight) of ethylene glycol, 160 milligrams of stannous octoate, and 8 milligrams of dibutyltin dilaurate (T-12 brand from M and T Chemical Co.) was stirred under vacuum with 130 grams (0.909 isocyanate equivalent weight) of a modified 4,4'-diphenyl methane diisocyanate (ISONATE 143L brand from Upjohn Chemical Co.). The final mixture, after being homogeneous, was poured into a preheated mold (70° C.). The resin cured in less than 30 seconds and was demolded and post cured at 125° C. for 1 hour. The thermoset plaque (3.18 mm thick) gave 384 kg/cm² of tensile strength (ASTM D412), 9.91×10³ kg/cm² of flexural modulus (ASTM D474), and 1.33 J/cm of notched IZOD impact resistance (ASTM D256). The heat sag resistance of the sample was measured to be 2.7 cm by the same way as described in Example 1.

EXAMPLE 9

A mixture containing 420 grams (0.430 hydroxy equivalent weight) of polypropylene glycol (NIAX polyol PPG 2025 brand from Union Carbide Co.), 58.0 grams (0.392 equivalent weight) of phthalic anhydride, 1.0 grams (0.010 equivalent weight) of maleic anhydride, 70.3 grams (1.33 equivalent weights) of acrylonitrile and 1.1 grams of azobisisobutyronitrile initiator (VAZO 64 brand from Du Pont) was purged with nitrogen for 30 minutes and heated at 70°–80° C. for about 45 minutes till the free radical polymerization subsided. The mixture was added with 154 grams (0.806 epoxy equivalent weight) of diglycidyl ether of bisphenol A (EPON 828 brand from Shell Chemical Co.) and 3.5 grams of lithium chloride/dimethyl formamide (1/1.5 complex). The mixture was then heated at 125°–135° C. for about one hour till the resulting product was free of acidic material. A polyacrylonitrile-grafted prepolymer was obtained.

A mixture of 80 grams of the above polyacrylonitrile grafted prepolymer, 25.3 grams (0.816 hydroxy equivalent weight) of ethylene glycol, 160 milligrams of stannous octoate, and 8 milligrams of dibutyltin dilaurate (T-12 brand from M and T Chemical Co.) was stirred under vacuum with 130 grams (0.909 isocyanate equivalent weight) of a modified 4,4'-diphenyl methane diisocyanate (ISONATE 143L brand from Upjohn Chemical Co.). The final mixture, after being homogeneous, was poured into a preheated mold (70° C.). The resin cured in less than 30 seconds and was demolded and post cured at 125° C. for 1 hour. The thermoset plaque (3.18 mm thick) gave 382 kg/cm$^2$ of tensile strength (ASTM D412), 11.8×10$^3$ kg/cm$^2$ of flexural modulus (ASTM D474), and 1.07 J/cm of notched IZOD impact resistance (ASTM D256). The heat sag resistance of the sample was measured to be 0.3 cm by the same way as described in Example 1.

EXAMPLE 10

A mixture containing 420 grams (0.430 hydroxy equivalent weight) of polypropylene glycol (NIAX Polyol PPG 2025 brand from Union Carbide Co.), 58.0 grams (0.392 equivalent weight) of phthalic anhydride, 1.0 grams (0.010 equivalent weight) of maleic anhydride, 112 grams (2.11 equivalent weight) of acrylonitrile and 1.1 grams of azobisisobutyronitrile initiator (VAZO 64 brand from Du Pont) was purged with nitrogen for 30 minutes and heated at 70°–80° C. for about 45 minutes till the free radical polymerization subsided. The mixture was added with 154 grams (0.806 epoxy equivalent weight) of diglycidyl ether of bisphenol A (EPON 828 brand from Shell Chemical Co.) and 3.5 grams of lithium chloride/dimethyl formamide (1/1.5 complex). The mixture was then heated at 125°–135° C. for about one hour till the resulting product was free of acidic material. The polyacrylonitrile grafted prepolymer was obtained.

A mixture of 80 grams of the above polyacrylonitrile grafted prepolymer, 25.3 grams (0.816 hydroxy equivalent weight) of ethylene glycol, 160 milligrams of stannous octoate, and 8 milligrams of dibutyltin dilaurate (T-12 brand from M and T Chemical Co.) was stirred under vacuum with 130 grams (0.909 isocyanate equivalent weight) of a modified 4,4'-diphenyl methane diisocyanate (ISONATE 143L brand from Upjohn Chemical Co.). The final mixture, after being homogeneous, was poured into a preheated mold (70° C.). The resin cured in less than 30 seconds and was demolded and post cured at 125° C. for 1 hour. The thermoset plaque (3.18 mm thick) gave 384 kg/cm$^2$ of tensile strength (ASTM D412), 10.1×10$^3$ kg/cm$^2$ of flexural modulus (ASTM D474), and 1.87 J/cm of notched IZOD impact resistance (ASTM D256). The heat sag resistance of the sample was measured to be 1.1 cm by the same way as described in Example 1.

COMPARATIVE EXAMPLE 11

A mixture containing 420 grams (0.430 hydroxy equivalent weight) of polypropylene glycol (NIAX Polyol PPG 2025 brand from Union Carbide Co.), 59 grams (0.602 equivalent weight) of phthalic anhydride, 154 grams (0.806 epoxy equivalent weight) of the diglycidyl ether of bisphenol A (EPON 828 brand from Shell Chemical Co.), and 2.5 grams of lithium chloride/dimethylformamide (1/1.5 complex) was heated at 125°–135° C. for about 75 minutes till the resulting product was free of acidic material. The product, a free flowing liquid, had a viscosity of 1,080 poise at 24° C.

A mixture of 80 grams of the above product, 25.3 grams of ethylene glycol, 80 milligrams of stannous ocatoate, and 16 milligrams of dibutyltin dilaurate (T-12 brand from M and T Chemical Co.) was stirred under vacuum with 132 grams of a modified 4,4'-diphenyl methane diisocyanate (ISONATE 143L brand from Upjohn Co.). The final mixture, after being homogeneous, was poured into a preheated mold (70° C.). The resin cured in less than 30 seconds and was demolded and post cured at 125° C. for 1 hour. The thermoset plaque (3.18 mm thick) gave 422 kg/cm$^2$ of tensile strength (ASTM D412), 11.3×10$^3$ kg/cm$^2$ of flexural modulus (ASTM D474), 1.06 J/cm of notched IZOD and 0.3 cm of heat sag.

EXAMPLE 12

A mixture containing 420 grams (0.430 hydroxy equivalent weight) of polypropylene glycol (NIAX polyol PPG 2025 from Union Carbide Co.), 58 grams (0.392 equivalent weight) of phthalic anhydride, 2.0 grams (0.020 equivalent weight) of maleic anhydride, 154 grams (0.806 epoxy equivalent weight) of the diglycidyl ether of bisphenol A (EPON 828 brand from Shell Chemical Co.), 2.22 grams of lithium chloride in methanol (30% LiCl), 33.4 grams (0.321 equivalent weight) of styrene, 0.80 grams of benzoyl peroxide, and 0.40 grams of t-butyl hydroperoxide was purged with nitrogen for 30 minutes. The mixture was stirred and heated at 125° C.±5° C. until the resulting product was free of acidic material and the free radical polymerization subsided. The residual monomers were stripped by high vacuum. The resulting prepolymer product was a cloudy viscous liquid (2240 poise at 24° C.).

A thermoset plaque was made from the above prepolymer using the same compositions and procedures as they were described in the third paragraph of Example 1. The thermoset plaque gave 485 kg/cm$^2$ of tensile strength (ASTM D 412), 9.35×10$^3$ kg/cm$^2$ of flexural modulus (ASTM D 474), 2.30 J/cm of notched IZOD (ASTM D 256), and 1.8 cm of heat sag.

EXAMPLE 13

A mixture containing 840 grams (0.860 hydroxy equivalent weight) of polypropylene glycol (NIAX polyol PPG 2025 from Union Carbide Co.) and 4.22 grams of a 30% lithium chloride solution in methanol was sparged with nitrogen at a rate of 5 liter/minute for one hour. To the the mixture was then added 116 grams (0.784 equivalent weight) of phthalic anhydride, 2.0 grams (0.020 equivalent weight) of maleic anhydride, and 308 grams (1.61 epoxy equivalent weight) of the diglycidyl ether of bisphenol A (EPON 828 brand from Shell Chemical Co.). The resulting mixture was then stirred and heated at 120°±4° C. until the resulting product had an acid number of less than 1.

To 540 grams of the above product was added 62 grams (0.60 equivalent weight) of styrene, 0.90 gram of an azo initiator (VAZO 52 brand from Du Pont), and 2.4 grams of bromotrichloromethane. The mixture was sparged with nitrogen for 30 minutes and then was heated with stirring at 50°–56° C. for about 16 hours. The resulting product was a viscous liquid (620 poise at 24° C.) and had an epoxide equivalent of 1883.

A thermoset plaque was made from the above prepolymer as described in Example 1. It had a tensile strength (ASTM D 412) of 460 kg/cm$^2$, a flexural modulus (ASTM D 474) of $13.1 \times 10^3$ kg/cm$^2$, a notched IZOD (ASTM D 256) of 1.55 J/cm., and a heat sag of 0.6 cm.

EXAMPLE 14

A mixture containing 300 grams (1.0 hydroxy equivalent weight) of polyethylene glycol (CARBOWAX 600 from Union Carbide) and 2.77 grams of a 30% lithium chloride solution in methanol was stripped by applying 5 mm Hg vacuum for 10 minutes. To the mixture was then added 145 grams (0.98 equivalent weight) of phthalic anhydride, 3.0 grams (0.031 equivalent weight) of maleic anhydride and 382 grams (2.0 epoxy equivalents) of EPON 828 diepoxide. The mixture was stirred and heated at 125°±10° C. until the resulting product had an acid number of less than 1.

To the above product at 60° C. was then added, with stirring, 152 grams of ethylene glycol. To the resulting mixture was then added 555 grams (4.34 equivalent weights) of n-butyl acrylate, 10.6 grams of hydroxyethyl methacrylate, 17 grams of bromotrichloromethane chain transfer agent and 5.54 grams of azobiscyanopentanoic acid. The resulting mixture was sparged with nitrogen for 30 minutes and then was heated with stirring at 75°–85° C. External cooling was applied while the free radical polymerization increased the temperature above 85° C. After about 2 hours, a sample of the resulting product was found to have 0.7% of unpolymerized monomer. The product was then cooled and transferred to a jar. The product had an epoxide equivalent of 1889 and a viscosity of 7,350 poise at 24° C.

Thermoset plaques were made by using the procedures described in Example 1 with the following composition: 80 grams of the above prepolymer, 23.1 grams of ethylene glycol, 80 mg of stannous octoate, 64 mg of dibutyltin dilaurate and 157 grams of ISONATE 143L isocyanate.

EXAMPLE 15

A mixture containing 315 grams (0.321 hydroxy equivalent weight) of polypropylene glycol (NIAX Polyol PPG 2025 from Union Carbide) and 1.58 grams of a 30% lithium chloride solution in methanol was sparged by nitrogen at 5 liter/minute. After one hour sparging, it was mixed with 4.4 grams (0.045 equivalent weight) of maleic anhydride, 37.6 grams (0.254 equivalent weight) of phthalic anhydride, and 116 grams (0.607 epoxy equivalent weight) of the diglycidyl ether of bisphenol A (EPON 828 brand from Shell Company). The mixture was heated with stirring at 120°±5° C. for about 25 hours until the product had an acid number of less than 1.

The above product, after cooling, was mixed with 65.7 grams of ethylene glycol, 114 grams (1.09 equivalent weights) of styrene, 4.0 grams of 2-hydroxyethyl methacrylate, 4.7 grams of dipentene and 1.77 grams of an azobisisobutyronitrile initiator (VAZO 64 brand from Du Pont). The mixture was purged with nitrogen for 30 minutes and was heated with stirring to a temperature above 60° C. The external heating was controlled so that the polymerization temperature increased gradually from 60° C. to 90° C. in 2.5 hours. The product had an epoxide equivalent of 2290 and a viscosity of 3800 poise at 25° C.

A thermoset plaque was made from the above prepolymer as in the method described in Example 1.

The Examples which are contained herein illustrate certain embodiments of the invention but should not be construed in a limiting sense. The scope of protection sought is set forth in the claims which follow.

What is claimed:

1. An isocyanate-reactive prepolymer containing at least one terminal epoxide group with an associated secondary hydroxy group, said prepolymer being modified by having grafted thereto a polymeric moiety derived from polymerizing an ethylenically unsaturated monomer.

2. A prepolymer as claimed in claim 1 which has the formula

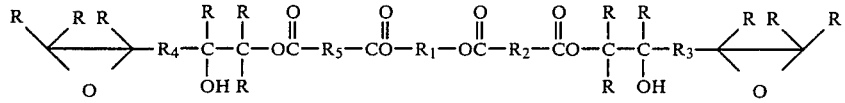

with $R_1$–$R_5$ being independently any group to which carbon atoms or oxygen atoms can be covalently bound to form a backbone chain and R being derived from $R_1$–$R_5$ to form a monovalent substituent or is hydrogen, with $R_2$ and $R_5$ being

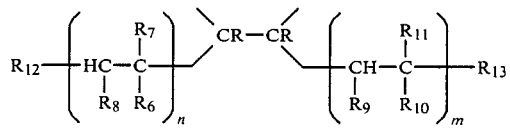

where $R_6$–$R_{13}$ are the same as R and m and n are 0 or any positive integer 3. A prepolymer as claimed in claim 1 which has the formula

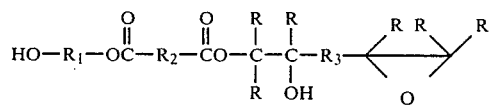

with $R_1$-$R_3$ being independently any group to which carbon atoms or oxygen atoms can be covalently bound to form a backbone chain and R is derived from $R_1$-$R_3$ to form a monovalent substituent or is hydrogen, with $R_2$ being

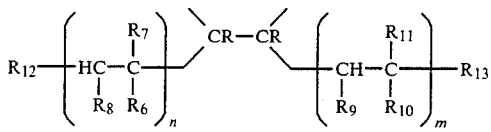

where $R_6$-$R_{13}$ are the same as R and m and n are 0 or any positive integer.

4. A prepolymer as claimed in claim 1 in which the polymeric moiety is derived from polymerizing a monomer which yields a relatively rigid polymeric material.

5. A prepolymer as claimed in claim 2 wherein the polymeric moiety is derived from polymerizing a monomer which yields a relatively rigid polymeric material.

6. A prepolymer as claimed in claim 3 in which the polymeric moiety is derived from polymerizing a monomer which yields a relatively rigid polymeric material.

7. A prepolymer as claimed in claim 1 in which the ethylenically unsaturated monomer is selected from the group consisting of acrylonitrile, styrene, and methyl methacrylate.

8. A prepolymer as claimed in claim 2 in which the ethylenically unsaturated monomer is selected from the group consisting of acrylonitrile, styrene, and methyl methacrylate.

9. A prepolymer as claimed in claim 3 in which the ethylenically unsaturated monomer is selected from the group consisting of acrylonitrile, styrene, and methyl methacrylate.

10. A prepolymer as claimed in claim 1 wherein the polymeric moiety is derived from polymerizing a monomer which yields a relatively rubbery polymeric material.

11. A prepolymer as claimed in claim 2 wherein the polymeric moiety is derived from polymerizing a monomer which yields a relatively rubbery polymeric material.

12. A prepolymer as claimed in claim 3 wherein the polymeric moiety is derived from polymerizing a monomer which yields a relatively rubbery polymeric material.

13. A prepolymer as claimed in claim 1 in which the ethylenically unsaturated monomer is selected from the group consisting of the alkyl acrylates and higher alkyl methacrylates.

14. A prepolymer as claimed in claim 2 wherein the ethylenically unsaturated monomer is selected from the group consisting of the alkyl acrylates and higher alkyl methacrylates.

15. A prepolymer as claimed in claim 3 wherein the ethylenically unsaturated monomer is selected from the group consisting of the alkyl acrylates and higher alkyl methacrylates.

* * * * *